United States Patent
Yamaji et al.

(10) Patent No.: US 9,473,245 B2
(45) Date of Patent: Oct. 18, 2016

(54) OPTICAL MODULE INCLUDING SEMICONDUCTOR OPTICAL MODULATOR

(71) Applicant: Sumitomo Electric Industries, Ltd., Osaka-shi (JP)

(72) Inventors: Kazuhiro Yamaji, Yokohama (JP); Yasuyuki Yamauchi, Yokohama (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 14 days.

(21) Appl. No.: 14/389,705

(22) PCT Filed: Feb. 28, 2014

(86) PCT No.: PCT/JP2014/055887
§ 371 (c)(1),
(2) Date: Sep. 30, 2014

(87) PCT Pub. No.: WO2014/133193
PCT Pub. Date: Sep. 4, 2014

(65) Prior Publication Data
US 2015/0078761 A1    Mar. 19, 2015

(30) Foreign Application Priority Data

Feb. 28, 2013  (JP) .................................. 2013-039305
Feb. 28, 2013  (JP) .................................. 2013-039340

(51) Int. Cl.
*H04B 10/04*    (2006.01)
*H04B 10/50*    (2013.01)
(Continued)

(52) U.S. Cl.
CPC ........... *H04B 10/501* (2013.01); *G02B 6/4213* (2013.01); *G02B 6/4214* (2013.01);
(Continued)

(58) Field of Classification Search
None
See application file for complete search history.

(56) References Cited

U.S. PATENT DOCUMENTS 6,477,284 B1* 11/2002 Oda ......................... G02B 6/10
385/14
2003/0081902 A1* 5/2003 Blauvelt ............ G02B 6/12002
385/50

(Continued)

FOREIGN PATENT DOCUMENTS

CN    101253517 A    8/2008
CN    101408623 A    4/2009

(Continued)

OTHER PUBLICATIONS

International Search Report and Written Opinion in PCT International Application No. PCT/JP2014/055887, dated Aug. 5, 2014.

(Continued)

*Primary Examiner* — Ken N Vanderpuye
*Assistant Examiner* — David Lambert
(74) *Attorney, Agent, or Firm* — Venable LLP; Michael A. Sartori; F. Brock Riggs

(57) ABSTRACT

An optical module that processes an input optical signal and outputs a processed optical signal is disclosed. The optical module provides a housing and an optical processing device in the housing. The housing provides an optical input port and an optical output port in a first wall thereof in side-by-side arrangement. A third wall of the housing only provides RF terminals. Second and fourth walls of the housing provide DC terminals. Electrical connection between the DC terminals with DC pads on the device is realized through a wiring substrate whose top avoids an optical path from the optical input port to the input port of the device.

10 Claims, 9 Drawing Sheets

(51) Int. Cl.
*G02B 6/42* (2006.01)
*G02F 1/225* (2006.01)
*G02F 1/21* (2006.01)

(52) U.S. Cl.
CPC ........... *G02B6/4265* (2013.01); *G02F 1/2255* (2013.01); *G02F 2001/212* (2013.01); *G02F 2201/127* (2013.01); *G02F 2201/58* (2013.01); *G02F 2203/20* (2013.01); *G02F 2203/60* (2013.01)

(56) References Cited

U.S. PATENT DOCUMENTS

2005/0213863 A1 9/2005 Sugiyama et al.
2008/0118202 A1 5/2008 Kato et al.
2012/0134620 A1 5/2012 Yamaji et al.
2012/0250136 A1* 10/2012 Maie ..................... G02F 1/0136
                                                        359/279

FOREIGN PATENT DOCUMENTS

EP          1298472 A1      4/2003
GB          2 402 226 A    12/2004
WO       WO-89/06812 A1    7/1989

OTHER PUBLICATIONS

Notification of the First Office Action in Chinese Patent Application No. 201480001076.4, dated Jun. 25, 2015.

* cited by examiner

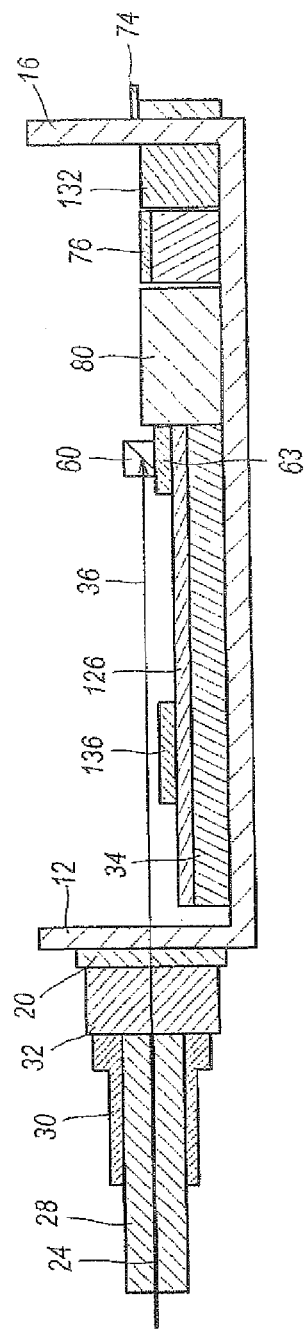

OPTICAL MODULE INCLUDING SEMICONDUCTOR OPTICAL MODULATOR

TECHNICAL FIELD

The present application relates to an optical module including a semiconductor optical modulator.

BACKGROUND ART

Recent optical communication system is implemented with an optical signal source including a semiconductor laser diode (hereafter denoted as LD) driven by a DC signal and an external modulator to modulate light with a continuous wave emitted from the LD to generate a modulated signal light. The external modulator may be a type of a Mach-Zender modulator, an electro-absorption (EA) modulator and so on. A United States patent published as US 2012/134620A has disclosed such an external modulator of the Mach-Zender type.

An optical transceiver applicable to the optical communication system generally includes an optical source, an optical modulator, and an optical receiver. The optical receiver receives an optical signal provided from an optical fiber coupled with the optical transceiver; while, the optical modulator modulates light of a continuous wave output from the optical source to provide modulated light into another optical fiber also coupled with the optical transceiver.

The optical modulator receives not only the continuous wave light from the optical source but electrical signals to modulate the continuous wave light. Moreover, an object to install the external modulator is to modulate the light with extremely high frequency signals, for instance, exceeding 10 GHz sometimes reaching 25 GHz. Such high frequency signals are easily to be degraded by interconnections. Accordingly, the optical modulator is necessary to be designed such that the optical arrangement is consistent with the electrical arrangement.

SUMMARY OF INVENTION

An aspect of the present application relates to an optical module that includes an optical processing device and a housing to install the optical processing device therein. The optical processing device includes an input port, an output port, a monitor port, RF signal pads, and DC signal pads. The housing includes an optical input port and an optical output port. The optical input port of the housing receives the input optical signal thereat. The optical output port outputs the processed optical signal therefrom. A feature of the optical module of the present application is that the optical output port has an axis aligned with the output port of the optical processing device such that the optical processing device is set within the housing as being offset from the longitudinal axis of the housing.

The housing has a rectangular shape with first to fourth walls, and the optical processing device also has a rectangular shape with first to fourth edges each facing the corresponding first to fourth walls of the housing. Features of the housing are that the optical input port and the optical output port are provided in the first wall in side by side arrangement, the third wall opposite to the first wall provides terminals for RF signals, and second and fourth walls connecting the first wall with the third wall provide the terminals for DC signals. Moreover, the housing has a space between the second edge and the second wall wider than a space between the fourth edge and the fourth wall.

The optical input port is arranged in the first wall, while, the input port of the optical processing device is arranged in the second edge, the optical path from the optical input port of the housing to the input port of the optical processing device is bent by substantially a right angle at a side of the optical processing device between the second edge and the second wall. The wider space secured in the side of the second edge of the optical processing device may mount the input coupling system to bend the optical path from the input optical port to the input port. Moreover, the optical module further provides a wiring substrate that electrically connects the terminals in the second wall with the DC pads in the second edge. A feature of the optical module of the present application is that the wiring substrate in the top thereof avoids the optical path from the optical input port to the input port.

BRIEF DESCRIPTION OF DRAWINGS

The foregoing and other purposes, aspects and advantages will be better understood from the following detailed description of a preferred embodiment of the invention with reference to the drawings, in which:

FIG. 2B shows a cross section taken along the line IIB-IIB shown in FIG. 2A;

DESCRIPTION OF EMBODIMENTS

Figure 1:
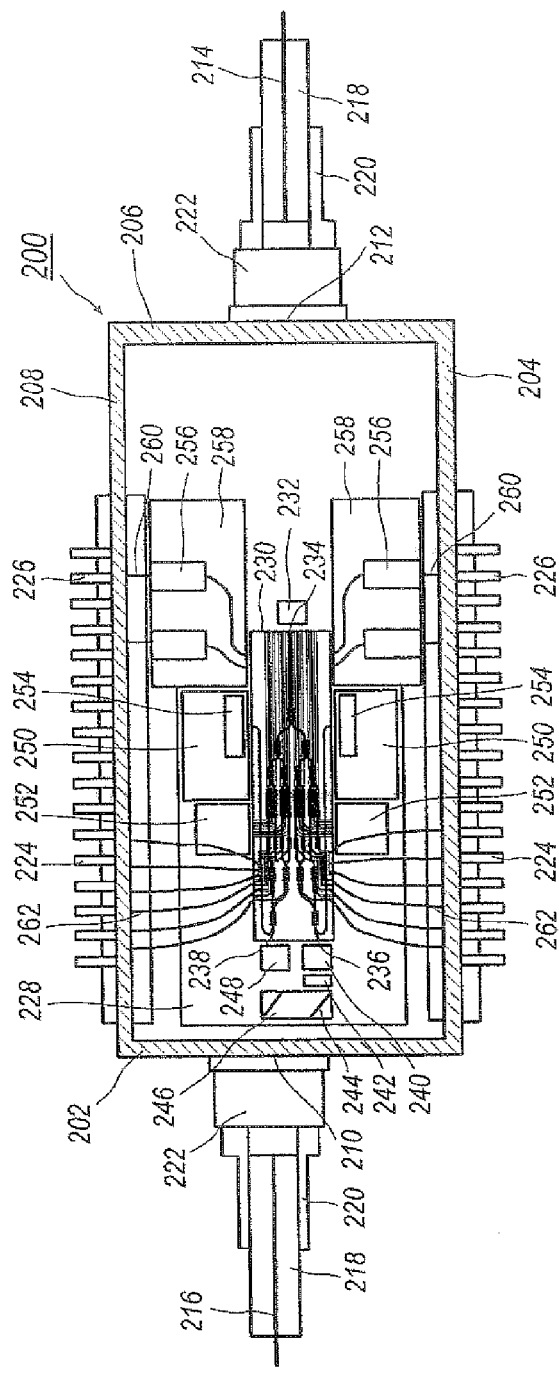
FIG. 1 is a plan view of an optical module comparable to embodiments of the present application.

An optical modulator comparable with those of embodiments of the present application will be first described. FIG. 1 is a plan view of the first comparable module that includes, in a first wall 202 of a housing 200, a window 210 through which modulated light is output, while, in the third wall 206 opposite to the first wall 202 provides another window 212 through which light of a continuous wave (CW) enters. Two windows, 210 and 212, show functions of the optical output port and the optical input port, respectively. The latter window 212 optically couples with an optical coupling unit including a holder 220 with a ferrule 218 to receive an optical fiber 214 and another holder 222 to install a lens therein. The former window 210 optically couples with another optical coupling unit that includes a holder 220 to hold a ferrule 218 for securing another optical fiber 216 and another holder 222 to set a lens therein.

The optical modulator mounts a device 230 on a thermoelectric cooler 228. The light output from the external fiber 214 enters the input port 234 provided in the edge of the device 230 facing the external fiber 214 through the lens 232. The device 230 modulates light entering the input port 234 to generate modulated light, which is output from the output ports, 236 and 238, each provided in another edge of the device 230 facing the optical fiber 216. Details of the device 230, in particular, inner structure such as the structure of the waveguides and so on, are omitted in FIG. 1.

The modulated light output from one output port 236, namely, the first output port, enters a half wave retarder 242 after passing through the collimating lens 240, where the half wave retarder 242 rotates the polarization of the light therethrough by 90°. The light whose polarization is rotated enters the polarization beam combiner (PBC) 246 after reflected at the mirror 244. On the other hand, the modulated light output from the other output port 238, namely, the second output port, directly enters the PBC 246 without passing the half wave retarder 242. The PBC 246 combines the former modulated light with the latter modulated light, and the combined light is coupled with the optical fiber 216 through the holder 222.

The housing 200 further installs monitor substrates 250 in both sides of the device 230, namely, between the device 230 and the second wall 204, and between the device 230 and the fourth wall 208. The monitor substrates 250 mount semiconductor devices, such as photodiodes, to monitor the modulated light. The terminator substrates 252 mount terminators electrically connected with electrodes in the device 230 for receiving high frequency signals.

Both sides of the device 230 also provide other substrates 258 that mounts driver circuits 256 to drive the device 230 and interconnections between the driver circuits 256 to the device 230. Specifically, the terminals 226 for high frequency signals in the device 230 couples with the driver circuit 256 through the interconnection 260, while, the terminals 224 for DC signals is connected with the device 230 via bonding wires 262.

The optical modulator thus described provides the input optical fiber 214 and the output optical fiber 216 in respective walls, 202 and 203, opposite to each other of the housing 200. This arrangement, that is, an arrangement in which the optical coupling between the input and output fibers has the first priority, forces the electrical arrangement in the second consideration. The terminals for the high frequency signals are divided into two walls, the second and fourth walls, 204 and 208, which require a precise adjustment of delay times in respective signals.

First Embodiment

Figure 2A:
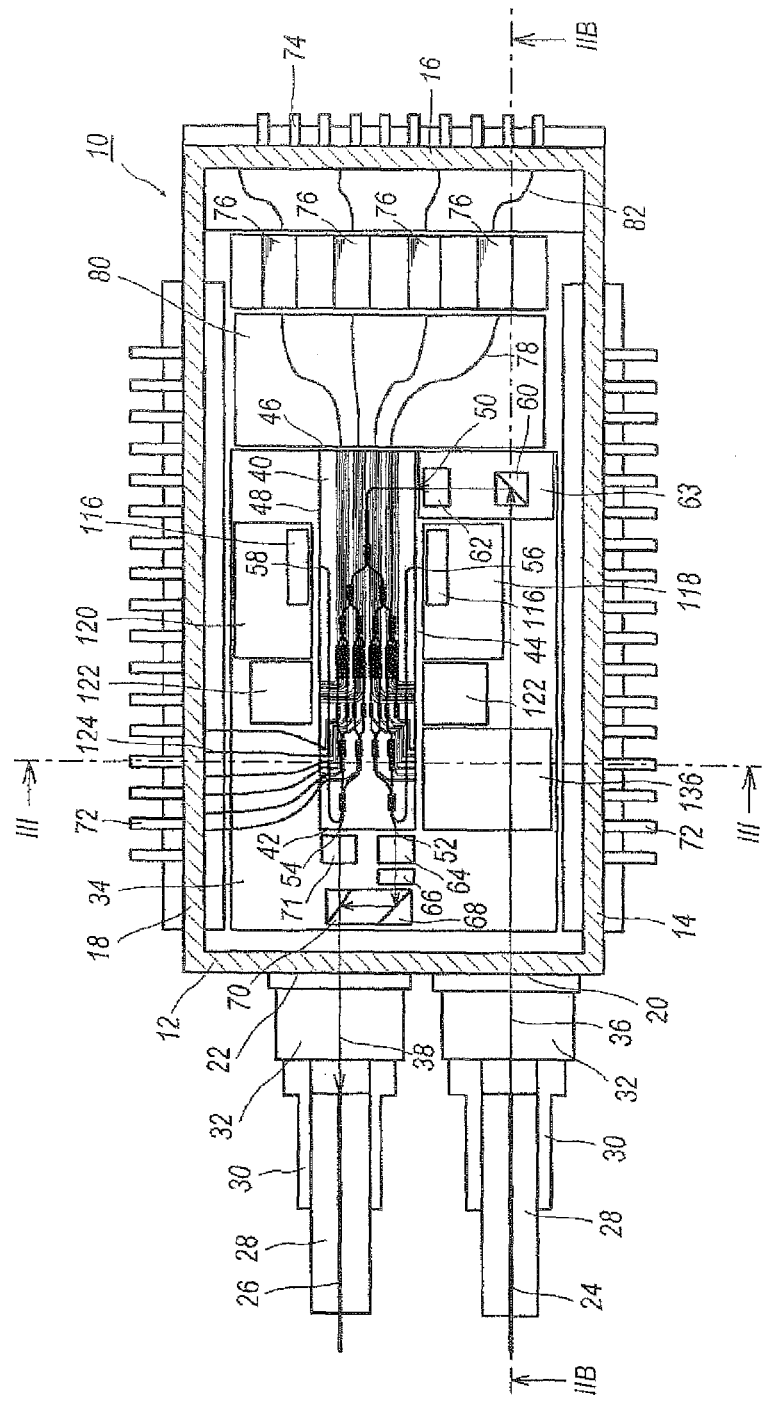
FIG. 2A is a plan view of an optical module of an embodiment of the present application.

FIGS. 2A and 2B are a plan view and a cross section, respectively, of a modulator module according to an embodiment of the present application, where FIG. 2B is taken along the line IIB-IIB appearing in FIG. 2A. The modulator module 10 shown in FIG. 2A electrically connects the modulator device 40 with the terminals 74 for the high frequency signals provided in the third wall 16. That is, the radio frequency (RF) terminals 74 for high frequency signals are formed in the side opposite to the side where the optical coupling portions 32 are assembled. The wiring substrate 136, which is arranged between the first wall 12 and the mirror 60, is placed in the side of the modulator device 40 facing the second wall 14. The wiring substrate 136 electrically connects the DC terminals provided in the second wall 14 with the pads, 86, 100, and 101, formed along the edge 44 of the modulator device 40. Another wiring substrate 80, which electrically connects the drivers 76 with the pads formed along the edge 46 of the modulator device 40, is placed between the third wall 16 and the modulator device 40. The input optical signal provided to the optical input port 20 heads for the mirror 60, is reflected by substantially a right angle toward the focusing lens 62, and enters the input port 54) of the modulator device 40. The mirror 60 and the focusing lens 62 are mounted on the coupling substrate 63.

Figure 3:
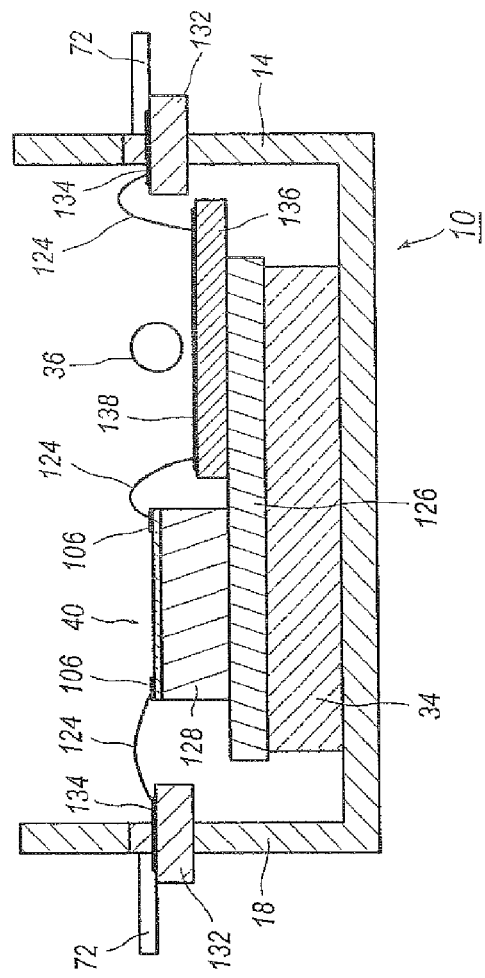
FIG. 3 shows a cross section of the optical module taken along the line III-III appearing in FIG. 2A.

Arrangements around the wiring substrate 136 will be described as referring to FIGS. 2B and 3. FIG. 3 shows a cross section of the modulator module 10 taken along the line III-III appearing in FIG. 2A. The thermo-electric cooler (TEC) 34 mounts the modulator device 40 through the first carrier 126 and the second carrier 128. The wiring substrate 136 is also mounted on the TEC 34 through the first carrier 126. The wiring substrate 136 of the embodiment has a thickness of about 0.5 mm.

The second and fourth walls, 14 and 18, provide feed-through substrates 132 on which interconnections 134 electrically connected to the DC terminals 72 are formed. A bonding wire 124 electrically connects the pad 106 formed on the modulator device 40 along the edge 48 with the interconnection 134 on the feed-through substrate 132 in the fourth wall 18. Another bonding wire 124 connects the interconnection 138 on the wiring substrate 136 with the interconnection 134 on the feed-through substrate 132 in the second wall 14; and still another bonding wire 124 connects the interconnection 138 on the wiring substrate 136 with the pad 106 on the modulator device 40 along the second edge 44. The terminals 72 in the second wall 14 are for the DC signals in the present embodiment. For instance, a signal to adjust a phase of the modulated light is carried on the terminal 72 and this signal is substantially a DC signal; accordingly, the interconnection 138 on the wiring substrate 136 does not degrade the signal quality even when the interconnection 138 does not have the impedance matching conditions. A feature of the arrangement thus described is that the wiring substrate 136 in the horizontal level thereof is lower than the axis of the input light 36, namely, the wiring substrate 136 does not interfere with the optical axis of the optical signal from the optical input port 20 of the housing to the input port 50 of the modulator device 40.

According to the first embodiment described above, the modulator module 10 arranges the optical input port 20 through which the input optical signal passes and the optical output port 22 through which the output optical signal passes in side-by-side configuration in the first wall 12. This arrangement of the optical ports, 20 and 22, shortens an interconnection for the RF signal. Although this arrangement of two optical ports, 20 and 22, crosses the optical axis for the input light with the interconnection between the DC terminals 72 in the second wall 14 and the DC pads on the modulator device 40 along the edge 44, the wiring substrate 136 whose horizontal level is lower than the optical axis of the input optical signal may prevent the interconnection from interfering with the input optical signal.

The RF terminals 74 and the interconnection, 78 and 82, connecting the RF terminals 74 with the modulator device 40 are provided in a side opposite to the first wall 12 where the optical ports, 20 and 22, for the input and output optical signals are provided. This arrangement of the RF terminals 74 makes the length between the RF terminals 74 and the modulator device 40 short. Moreover, because all RF terminals 74 are disposed in the third wall 16, the skew between electrical signals is effectively eliminated. The wiring substrate 136 arranged in the side of the modulator device 40 so as to cross the optical path 36 of the input optical signal but secure an interval vertically may electrically connect the DC terminal 72 provided in the second wall 14 with the modulator device 40 in the side 44 thereof.

Two optical beams each output from the output ports, 52 and 54, of the modulator device 40 enters the output coupling system including two collimating lenses, 64 and 71, a half wave retarder 66, a mirror 68, and a polarization beam combiner (PBC) 70. The collimating lenses, 71 and 64, collimate optical beam each output from the output ports, 42 and 52, of the modulator device 40. One of the collimated beams is rotated in the polarization thereof by the half wave retarder 64, and reflected by the mirror 68 toward the PBC 70. The PBC 70, which has greater reflectivity but smaller transmittance for the optical signal coming from the mirror 68; while, for the optical signal coming from the collimating lens 71 not rotated in the polarization thereof, the PBC 70 shows greater transmittance but smaller reflectivity. Thus, the PBC 70 effectively combines two optical signals having polarizations different from each other by 90° and outputs thus combined optical signals to the output port 22 of the modulator module 10.

Figure 4:
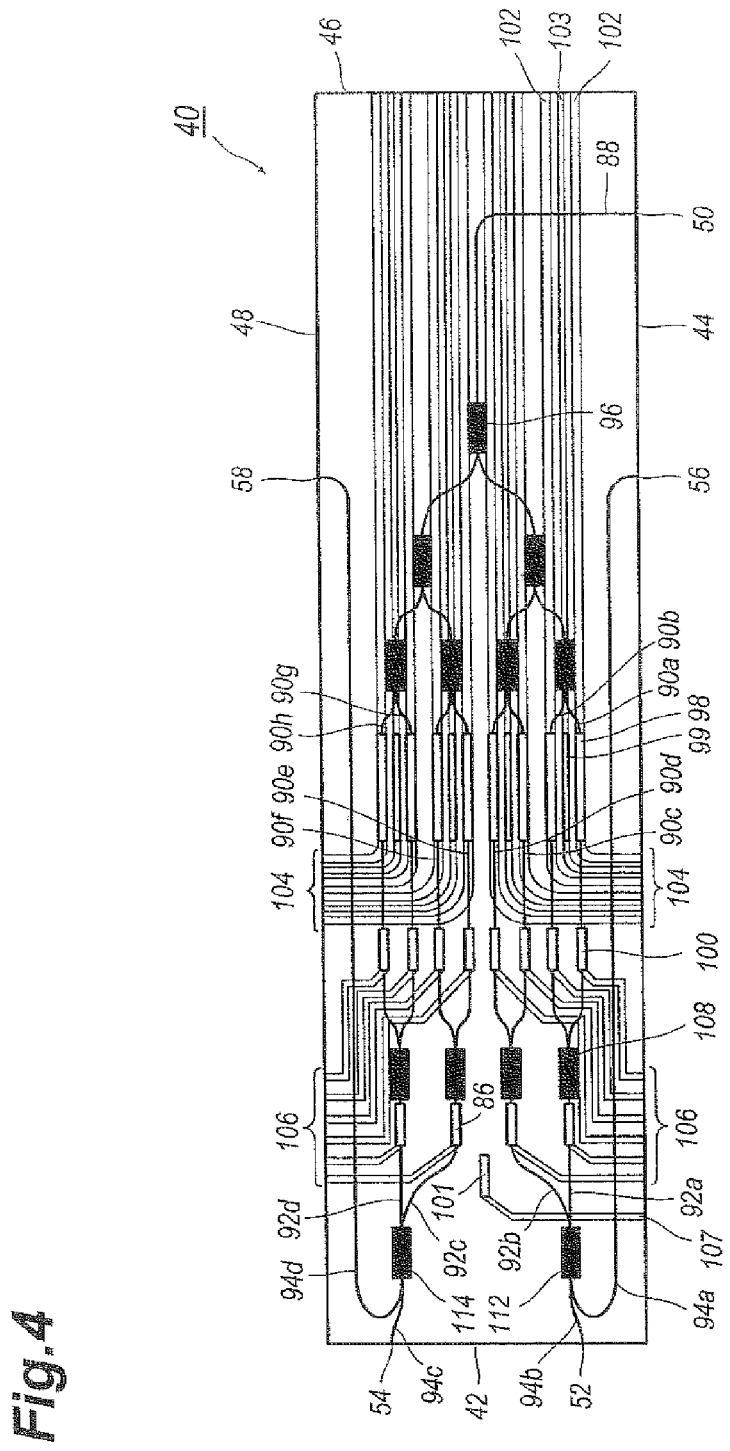
FIG. 4 is a plan view magnifying the modulator device installed within the optical module shown in FIG. 2A.

The modulator device 40 to modulate light will be described. FIG. 4 is a plan view of the modulator device 40. The modulator device 40 has a rectangular shape having four edges, 42 to 48, an input port 50 in the second edge 44, two output ports, 52 and 54, in the first edge 42, two monitor ports, 56 and 58, in the second and fourth edges, 44 and 48, and many waveguides, 88 to 94, on a primary surface of the modulator device 40. The modulator device 40 also provides pads, 102 to 106, to provide the RF signals and the DC signals on the electrodes, 98 to 100, in the modulator device 40. The electrodes, 98 to 100, are formed on respective waveguides to modulate or shift the phase of the light propagating in the waveguides.

Specifically, the waveguide 88 coupled with the input port 50 in the second edge 44 is divided into waveguides, 90a to 90h, by Y-branch optical dividers 96 disposed threefold. Each of the waveguides, 90a to 90h, provides the electrode 98 for modulating light and the electrode 100 for shifting the phase of the light. The electrode 98 receives the modulation signal (RF signal) from the drivers 76 through the interconnection 102 whose end at the edge 46 has a function of the pad. Arranged between two electrodes 98 is a ground electrode 99. One end of the ground electrode 99 is connected to the ground terminal of the drivers 76 through the interconnection 103. Other ends of the electrodes, 98 and 99, are terminated through the interconnections 104. Terminators are placed outside of the modulator device 40 along the edges, 44 and 48. Supplying the RF signals complementary to each other in the electrodes 98 through the interconnections 102, the light propagating in the waveguides, 90a to 90h, are modulated by varying the phases thereof. The electrode 100 for shifting the phase of the light receives the DC bias through the interconnections 106 the ends of which at the edges, 44 and 48, also give a function of the bonding pad. The electrode 101, which is connected to the external ground through the interconnection 107, gives the ground potential on the modulator device 40. Supplying the DC bias on the electrodes 100, the phase of the light propagating in the waveguides, 90a to 90h, may be shifted.

The optical coupler 108 combine eight waveguides, 90a to 90h, into four waveguides, 92a to 92d. Each of the combined waveguides, 92a to 92d, provide the electrodes 86 to adjust the phase of the light propagating the waveguides, 92a to 92d, formed thereunder. The waveguides, 92a and 92b, are joined by the optical coupler 112 in one end thereof, and two waveguides, 94a and 94b, branches from the optical coupler 112 in another end, where the former waveguide 94a couples with the monitor port 56 in the edge 44; while, the latter waveguide 94b couples with the output port 52. Other two waveguides, 92c and 92d, are joined by the other beam combiner 114 in one end, and two waveguides 94c and 94d, branches from the beam combiner 114, where the former waveguide 94c couples with the other output port 54, while, the latter waveguide 94d couples with the other monitor port 58 in the edge 48.

In the modulator device 40 shown in FIG. 4, the modulated optical beams are output from the output ports, 52 and 54, in the first edge 42, and from the monitor ports, 56 and 58, provided in the second and fourth edges, 44 and 48, respectively. In order to operate the modulator device 40 stably, the optical power output from the output ports, 52 and 54, are preferably detected and detected results are fed back to the control of the modulator device 40. As shown in FIG. 2A, various optical components, such as mirrors, beam splitters, a half-wave retarder and so on are arranged between the first wall 12 and the first edge 42 so as to leave substantially no room for placing a monitor device. Also, the wiring substrate 80 to form the RF interconnections 78 thereon is arranged between the third wall 16 and the third edge 46 so as to leave substantially no room to arrange monitor devices. Accordingly, spaces facing the second and fourth edges, 44 and 48, are the rest means to dispose the monitor devices.

Two monitor substrates, 118 and 120, each mounting the monitor photodiodes 116, are described. In order to make the modulator module 10 compact, the spaces in a side of the modulator device 40 should be small as possible as securing at least a space to mount the monitor substrates, 118 and 120. The monitor substrates, 118 and 120, mount, in addition to the monitor photodiodes 116, an integrated circuit (IC), resistors, capacitors, and so on, to constitute the monitoring circuit which requires a substantial area. Moreover, the monitoring circuits on respective monitor substrates, 118 and 120, have the same function. Accordingly, two monitor substrates, 118 and 120, have the area substantially same to each other and a rectangular shape extending along the edges, 44 and 48, of the modulator device 40 as shown in FIG. 2A.

(First Modification)

Figure 8:
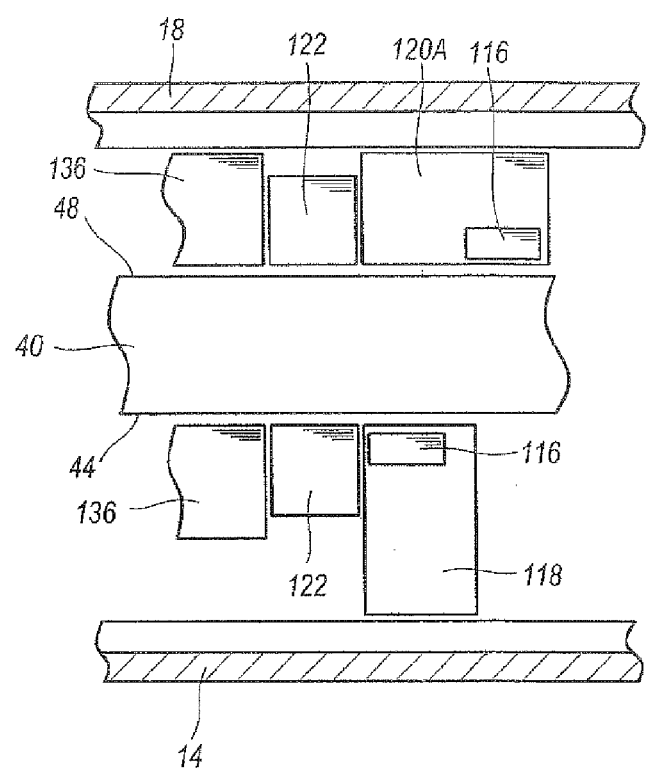
FIG. 8 magnifies a portion of the monitor substrate provided in both sides of the modulator device.

FIG. 8 magnifies a portion where two monitor substrates, 118 and 120A, are mounted. FIG. 8 also omits details of the modulator device 40. As shown in FIG. 8, the monitor substrate 120A has a rectangular shape as that of the aforementioned monitor substrate 120 but the monitor substrate 120A of the present example is extended along a lateral direction of the modulator module 10. Moreover, the modulator device 40 of the present example provides the monitor ports, 56 and 58, diagonally in respective edges, 44 and 48, of the modulator device 40. In an optical module, when two optical ports are arranged in one edge, a substantial distance is necessary between two optical ports because respective ports assemble with additional optical components. The distance between the ports is for instance 5 mm. However, the modulator device 40 in the plane dimensions thereof is determined by the optical function thereof; that is, two output ports of the modulator device 40 have a distance therebetween but far shorter than the distance between the two optical output ports, 20 and 22, of the modulator module 10.

Moreover, in order to construct the optical system connecting the modulator device 40 with the optical output ports, 20 and 22, of the modulator module 10 to be simple as possible, one output port 54 of the modulator device 40 is preferably aligned with one optical output port 22 of the modulator module 10, namely, two output ports, 22 and 54, are preferably arranged on a common axis. The example shown in FIGS. 2 and 8 provides the output port 54 aligned with the optical axis 38 of the optical output ports. Accordingly, the modulator module 10 of the embodiment has a space between the second edge 44 and the second wall 14 wider than a space between the fourth edge 48 and the fourth wall 18. The light entering from one of the port 20 passes the former space between the second edge 44 and the second wall 14 to be input into the modulator device 40 after reflected by the mirror 60 and the focusing lens 62.

Thus, the modulator module 10 shown in FIG. 8 disposes the monitor substrate 118 placed in portrait between the second edge 44 and the second wall 14 and another monitor substrate 120A placed in landscape between the edge 48 and the fourth wall 18, where the direction "portrait" means that a longer sides of a rectangle crosses the longitudinal axis of the modulator module 10, while, the direction "landscape" means that a longer sides of a rectangle is along the longitudinal axis. The monitor substrate 118 placed in portrait makes a space to install the coupling substrate 63 to mount the mirror 60 and the focusing lens 62 thereon in a side neighbor to the monitor substrate 118. The arrangement shown in FIG. 8 places the monitor photodiodes 116 in diagonal. However, the monitor substrate 120A may mount the monitor photodiode 116 in a position corresponding to that of the other monitor photodiode 116 on the monitor substrate 118. That is, the position of the monitor photodiode 116 on the monitor substrate 120A may be slid to a position just facing the other monitor photodiode 116 on the monitor substrate 118. In such an arrangement, the modulator device 40 may provide the monitor ports, 56 and 58, in respective positions shown in FIG. 2A.

Because the monitor substrate 118 is placed in portrait, the optical path from the input port 20 to the mirror 60 intersects the monitor substrate 118, that is, the optical path is possibly interfered with elements mounted on the monitor substrate 118. The modulator module 10 of the embodiment lowers the top of the monitor substrate 118 so as not to interfere the components thereof with the optical path.

Second Embodiment

Figure 5:
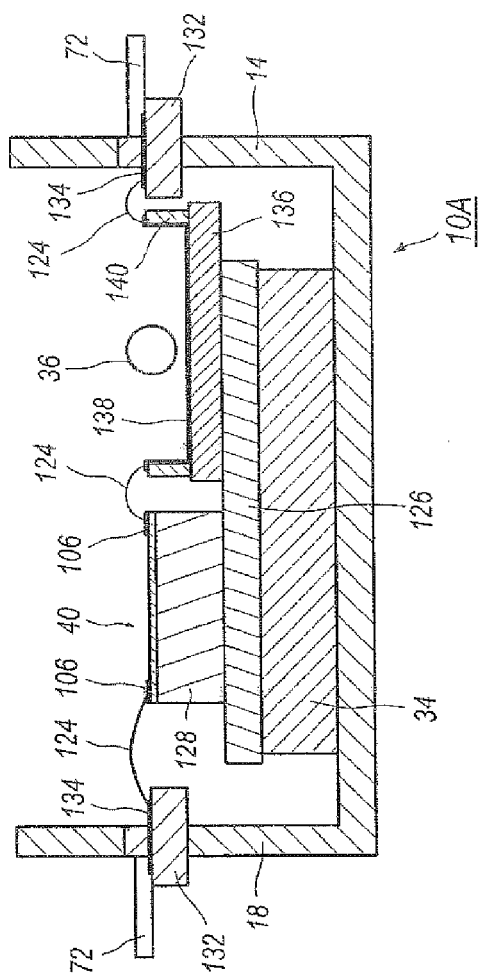
FIG. 5 shows a cross section of the optical module according to the second embodiment.

FIG. 5 shows a cross section taken along the line III-III appearing in FIG. 2A but the module 10A is the second embodiment according to the present application. The optical module 10A shown in FIG. 5 has features distinguishable from the arrangement of the first embodiment 10 shown in FIG. 2A that the wiring substrate 136 provides conductive dies 140 in the ends of the interconnection 138 and the bonding wires 124 are bonded to the top of the conductive die 140 from the interconnection 134 on the feed-through substrate 132 and the pads 106 on the modulator device 40. Other arrangements of the optical module 10A are same as those of the aforementioned embodiment.

The optical module 10A of the second embodiment, because the electrical connection between the feed-through substrate 132 and the wiring substrate 136, and between the modulator device 40 and the wiring substrate 136, are performed through the conductive dies 140 which levels the top thereof with the top of the feed-through substrate 132 and the top of the modulator device 40. Resultantly, the bonding wires 124 may be shortened.

The embodiment shown in FIG. 5 provides the electrically conductive die 140; however, the die 140 may be replaced to a part made of insulating material but interconnections are formed in the top thereof and on the side wall thereof to connect the top interconnection electrically with the interconnection 138 on the wiring substrate 136. In a modification, the insulating die may be formed integrally with the wiring substrate 136, and the interconnection 138 on the top of the wiring substrate 136 is extended to the top of the die 140.

Third Embodiment

Figure 6:
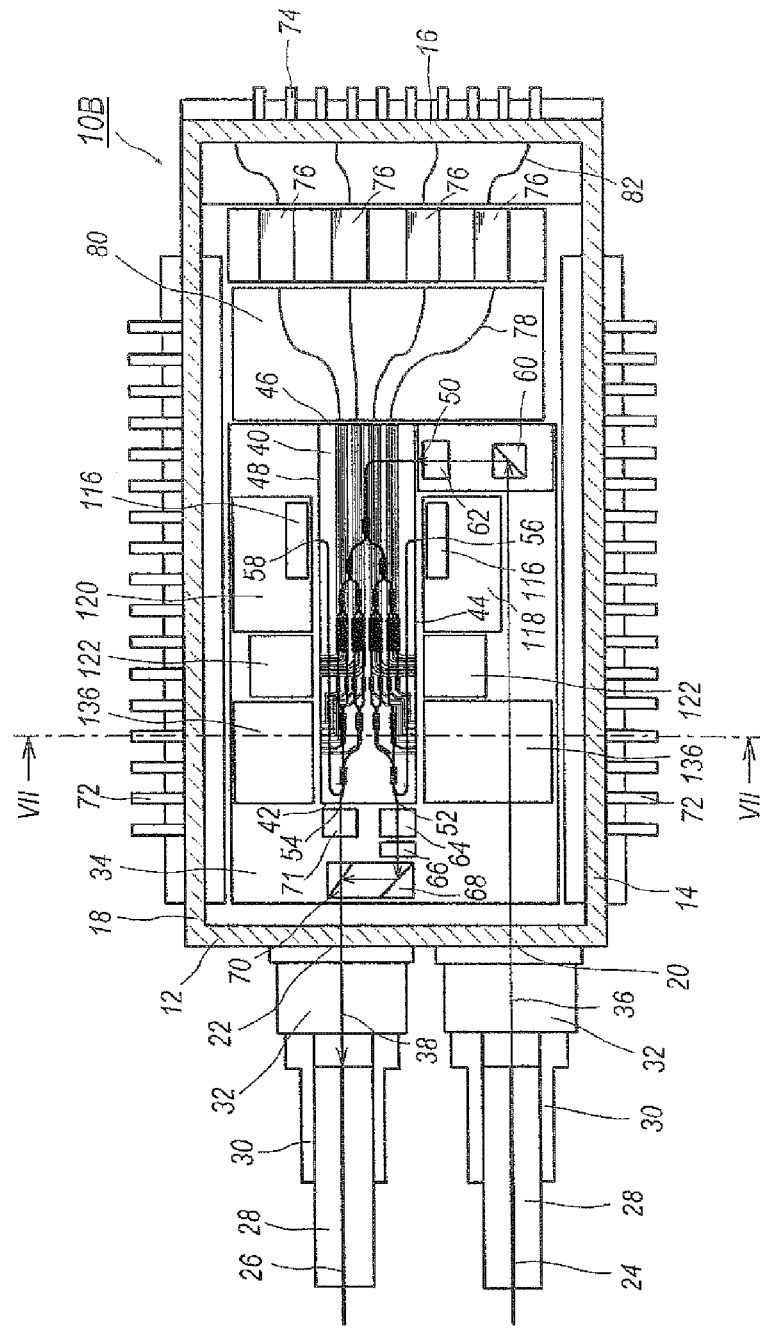
FIG. 6 is a plan view of an optical module of the third embodiment.

FIG. 6 is a plan view of another modulator module 10B according to the third embodiment of the present application. The modulator module 10B of FIG. 6 has a feature distinguishable from the former embodiments that another wiring substrate 136 is provided in the side facing the edge 48 of the modulation device 40. That is, the aforementioned embodiment connects the DC terminals 72 in the fourth wall 18 with the pads 106 on the modulator device 40 with bonding wires 124; while, the present embodiment connects the DC terminal 72 with the pads 106 through the other wiring substrate 136.

Figure 7:
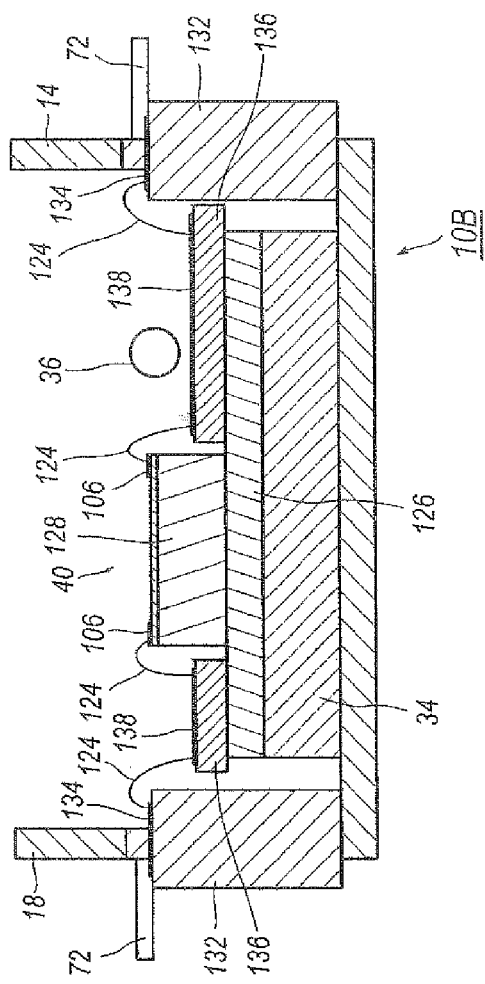
FIG. 7 shows a cross section taken along the line VII-VII appearing in FIG. 6.

FIG. 7 shows a cross section taken along the line VII-VII appearing in FIG. 6. As shown in FIG. 7, the modulator module 10B provides two wiring substrates 136 in both sides of the modulator device 40. DC terminals 72 in the wall 18 facing the edge 48 are connected to the pads 106 on the modulator device 40 through the interconnection 134 on the feed-through substrate 132, the bonding wire 124, the interconnection 138 on the wiring substrate rate 136, and the bonding wire 124. Similarly, the DC terminals 72 in the wall 14 facing the edge 44 are electrically connected with the pads 106 on the modulator device 40 through the interconnection 134 on the feed-through substrate 132, the bonding wire 124, the interconnection 138 on the wiring substrate 136, and the bonding wire 124. Moreover, the interconnection 138 on the wiring substrate 136, and the bonding wires 124 between the edge 44 and the wall 14 never interfere with the optical axis 34 of the input optical beam because the top of the wiring substrate 136 is lowered in the level thereof than the optical axis 36. The wiring substrate 136 provided in the other side of the modulator device 40 is independent from the optical axis 36; however, the interconnection 138 on the wiring substrate 136 may shorten the length of the bonding wire, which may secure the reliability of the modulator module. A bonding wire with an unnecessarily length often causes short-circuit to the next bonding wire.

Thus, the modulator module 10B, because the lengthened bonding wires connected in the pads along the edge 48 are replaced to the wiring substrate 136, which may secure the reliability of the modulator module 10B, in particular, the reliability against the mechanical vibration and/or shock applied to the optical module.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. An optical module that receives an input optical signal and outputs a processed optical signal, comprising:
an optical processing device configured to receive the input optical signal and output the processed optical signal, the optical processing device having a rectangular plane shape with first to fourth edges, the optical processing device further having an input port in the second edge, an output port in the first edge, a monitor port in at least one of the second and fourth edges, RF signal pads in the third edge opposite to the first edge, and DC signal pads in the second and fourth edges;

a housing having a rectangular plane shape including first to fourth walls corresponding to the first to fourth edges of the optical processing device, the housing further having an optical input port and an optical output port in the first wall, the optical input port receiving the input optical signal thereat, the optical output port outputting the processed optical signal therefrom, the optical output port being aligned with the output port of the optical processing device;

an input coupling system provided between the second wall of the housing and the second edge of the optical processing device, the input coupling system guiding the input optical signal provided in the optical input port of the housing to the input port of the optical processing device; and a wiring substrate that electrically connects terminals provided in the second wall of the housing to the DC signal pads provided in the second edge of the optical processing device, wherein the optical module installs the optical processing device in the housing as being offset from a longitudinal axis of the housing and provides a space between the second wall and the second edge wider than a space between the fourth wall and the fourth edge, and wherein the wiring substrate has a top level thereof avoiding an optical path of the input optical signal from the optical input port of the housing to the input port of the optical processing device.

2. The optical module of claim 1,
wherein the input coupling system includes a mirror that reflects the input optical signal provided from the optical input port of the housing toward the input port of the optical processing device by substantially a right angle.

3. The optical module of claim 1,
wherein the wiring substrate provides interconnections thereon, the DC signal pads in the optical processing device being electrically connected with the terminals in the second wall through bonding wires connecting the DC signal pads to the interconnections on the wiring substrate, the interconnections, and other bonding wires connecting the interconnections to the terminals in the second wall.

4. The optical module of claim 1,
wherein the wiring substrate provides interconnections, first conductive dies set in first ends of the interconnections, and second conductive dies set in second ends of the interconnections, the DC signal pads in the optical processing device being electrically connected with the terminals in the second wall through bonding wires connecting the DC signal pads to the first conductive dies, the interconnections, and other bonding wires connecting the second conductive dies to the terminals provided in the second wall.

5. The optical module of claim 1,
wherein the monitor port of the optical processing device is arranged in the second edge of the optical processing device,
wherein the optical module further includes a monitor substrate that mounts an optical monitoring device and an electronic circuit for processing an output of the optical monitoring device, and
wherein the monitor substrate, the optical monitoring device, and the electronic circuit avoid an optical path of the input optical signal from the optical input port of the housing to the input port of the optical processing device.

6. A modulator module, comprising:
a modulator device for modulating an input optical signal and outputting two modulated optical signals, the modulator device including an input port for inputting the input optical signal thereat and two output ports for outputting the respective modulated optical signals therefrom, RF signal pads, and DC signal pads, where the modulator device has a rectangular plane shape having first to fourth edges, the input port being provided in the second edge, the two output ports being provided in the first edge, the RF signal pads being arranged only along the third edge, the DC signal pads being arranged along the second and fourth edges;

a housing with a rectangular shape formed by first to fourth walls, having an optical input port in the second wall, an optical output port in the first wall, RF terminals only in the third wall, and DC terminals only in the second and fourth walls;

a wiring substrate that electrically connects the DC terminals in the second wall of the housing to the DC signal pads along the second edge of the modulator device, the wiring substrate having a top level avoiding an optical path of the input optical signal from the optical input port in the first wall of the housing to the input port in the modulator device;

an input coupling system arranged between the second wall of the housing and the second edge of the modulator device, the input coupling system optically coupling the optical input port with the input port of the modulator device, the input coupling system providing a mirror; and an output coupling system provided between the first wall of the housing and the first edge of the modulator device, the output coupling system optically coupling the optical output port with the two output ports of the modulator device, the output coupling system providing a half wave retarder that rotates a polarization of one of the two modulated optical signals by substantially a right angle, wherein the modulator device is set in the housing as being offset from a longitudinal axis of the housing, the optical output port of the housing having an axis common to an axis of one of the two output ports of the modulator device such that the modulator module has a space between the second wall and the second edge where the wiring substrate and the input coupling system are installed wider than a space between the fourth wall and the fourth edge.

7. The modulator module of claim 6,
wherein the input coupling system is mounted on a coupling substrate installed in the space between the second wall and the second edge.

8. The modulator module of claim 7,
wherein the input coupling system reflects the input optical signal provided to the optical input port in the first wall toward the input port in the second edge of the modular device.

9. The modulator module of claim 6,
wherein the output coupling system further includes two collimating lenses, a mirror, and a polarization beam combiner, the two collimating lenses collimating the two modulated optical signals output from respective output ports of the modulator device, the half wave retarder rotating of the polarization of the one of the two modulated optical signals, and the polarization beam combiner combining another of the two modulated optical signals with the one of the two modulated optical signals whose polarization is rotated by the half wave retarder, and the output coupling system providing the polarization combined optical beams to the output port of the housing.

10. The modulator module of claim 6,
further including drivers that electrically drive the modulator device,
wherein the drivers are mounted in a space between the third wall and the third edge of the modulator device.

\* \* \* \* \*